United States Patent
Friedrich

(10) Patent No.: US 9,718,555 B2
(45) Date of Patent: Aug. 1, 2017

(54) BLADDER-FREE FUEL TANK

(71) Applicant: PFW Aerospace GmbH, Speyer (DE)

(72) Inventor: Thomas Friedrich, Woerthsee (DE)

(73) Assignee: PFW Aerospace GmbH, Speyer (DE)

( * ) Notice: Subject to any disclaimer, the term of this patent is extended or adjusted under 35 U.S.C. 154(b) by 0 days.

(21) Appl. No.: 14/887,758

(22) Filed: Oct. 20, 2015

(65) Prior Publication Data

US 2016/0107760 A1    Apr. 21, 2016

(30) Foreign Application Priority Data

Oct. 20, 2014  (EP) .................................. 14189525

(51) Int. Cl.
| | |
|---|---|
| *B60K 15/03* | (2006.01) |
| *B64D 37/02* | (2006.01) |
| *B64D 37/04* | (2006.01) |
| *B64D 37/06* | (2006.01) |

(52) U.S. Cl.
CPC .............. *B64D 37/02* (2013.01); *B60K 15/03* (2013.01); *B64D 37/04* (2013.01); *B64D 37/06* (2013.01); *Y02T 50/44* (2013.01)

(58) Field of Classification Search
CPC .................................................... B60K 15/03
USPC .......................................... 220/567.2, 567.1
See application file for complete search history.

(56) References Cited

U.S. PATENT DOCUMENTS

| | | | |
|---|---|---|---|
| 2,928,565 A * | 3/1960 | Glasoe, Jr. ............. | B65D 90/06 114/74 A |
| 4,744,137 A * | 5/1988 | Palazzo ................ | B65D 90/029 138/149 |
| 5,103,996 A * | 4/1992 | McGarvey .......... | B28B 19/0038 220/484 |
| 5,320,247 A | 6/1994 | Sharp | |
| 6,422,413 B1 * | 7/2002 | Hall ..................... | B65D 90/028 220/4.12 |
| 7,090,167 B2 | 8/2006 | Friddell et al. | |
| 7,093,470 B2 | 8/2006 | El-Soudani | |
| 8,048,346 B2 * | 11/2011 | Murphy ................. | B28B 7/168 249/177 |
| 8,550,403 B2 | 10/2013 | Yamaguchi et al. | |
| 2001/0038013 A1 * | 11/2001 | Frey, Jr. ................ | B65D 90/04 220/567.1 |
| 2009/0145909 A1 | 6/2009 | Hausberger | |
| 2010/0146992 A1 * | 6/2010 | Miller ...................... | F17C 3/04 62/47.1 |
| 2012/0181288 A1 | 7/2012 | Childress et al. | |

FOREIGN PATENT DOCUMENTS

| | | |
|---|---|---|
| EP | 2 048 079 A2 | 4/2009 |
| WO | WO 2007/121969 A1 | 11/2007 |

* cited by examiner

*Primary Examiner* — Stephen Castellano
(74) *Attorney, Agent, or Firm* — Muncy, Geissler, Olds & Lowe, P.C.

(57) ABSTRACT

A fuel tank or bladder-free fuel tank having a reservoir on its inside area, limited to an outside area by a double-walled structure. The double-walled structure has an outer wall and an inner wall. A rib structure includes at least one rib extending inwardly into the inside area of the bladder-free fuel tank from the double-walled structure.

19 Claims, 12 Drawing Sheets

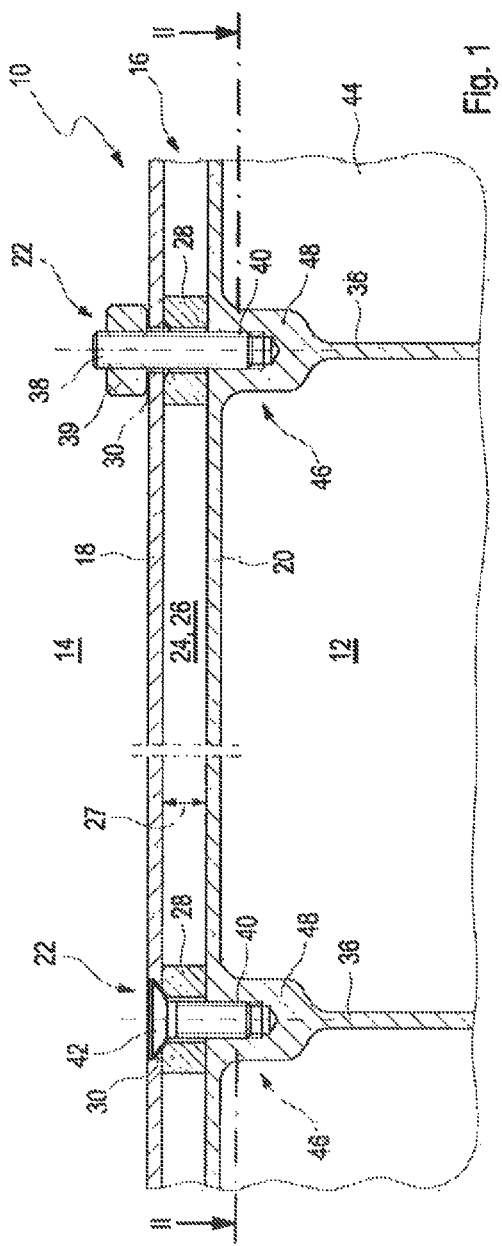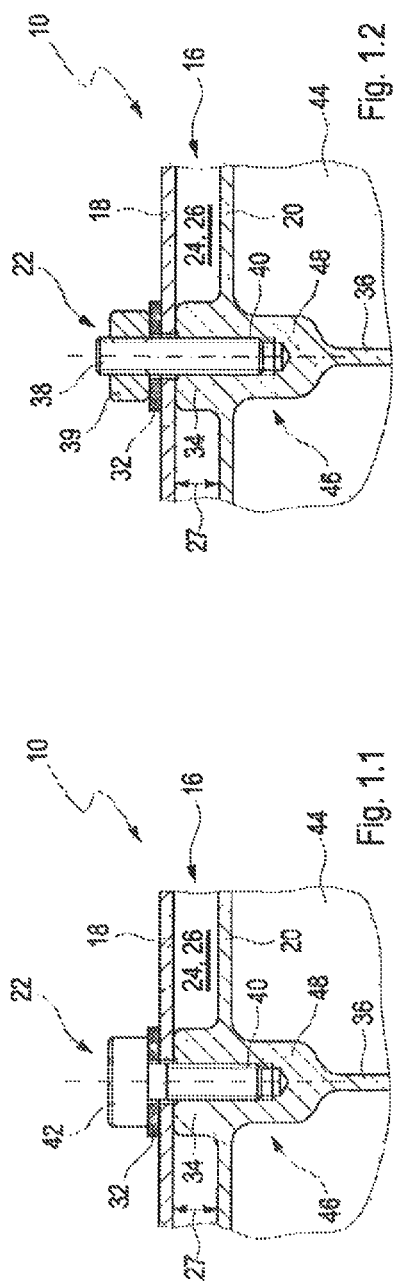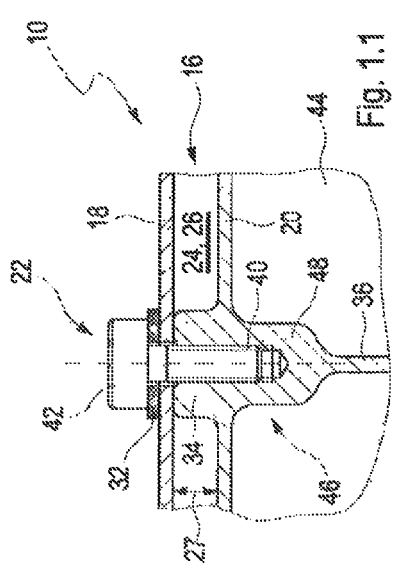

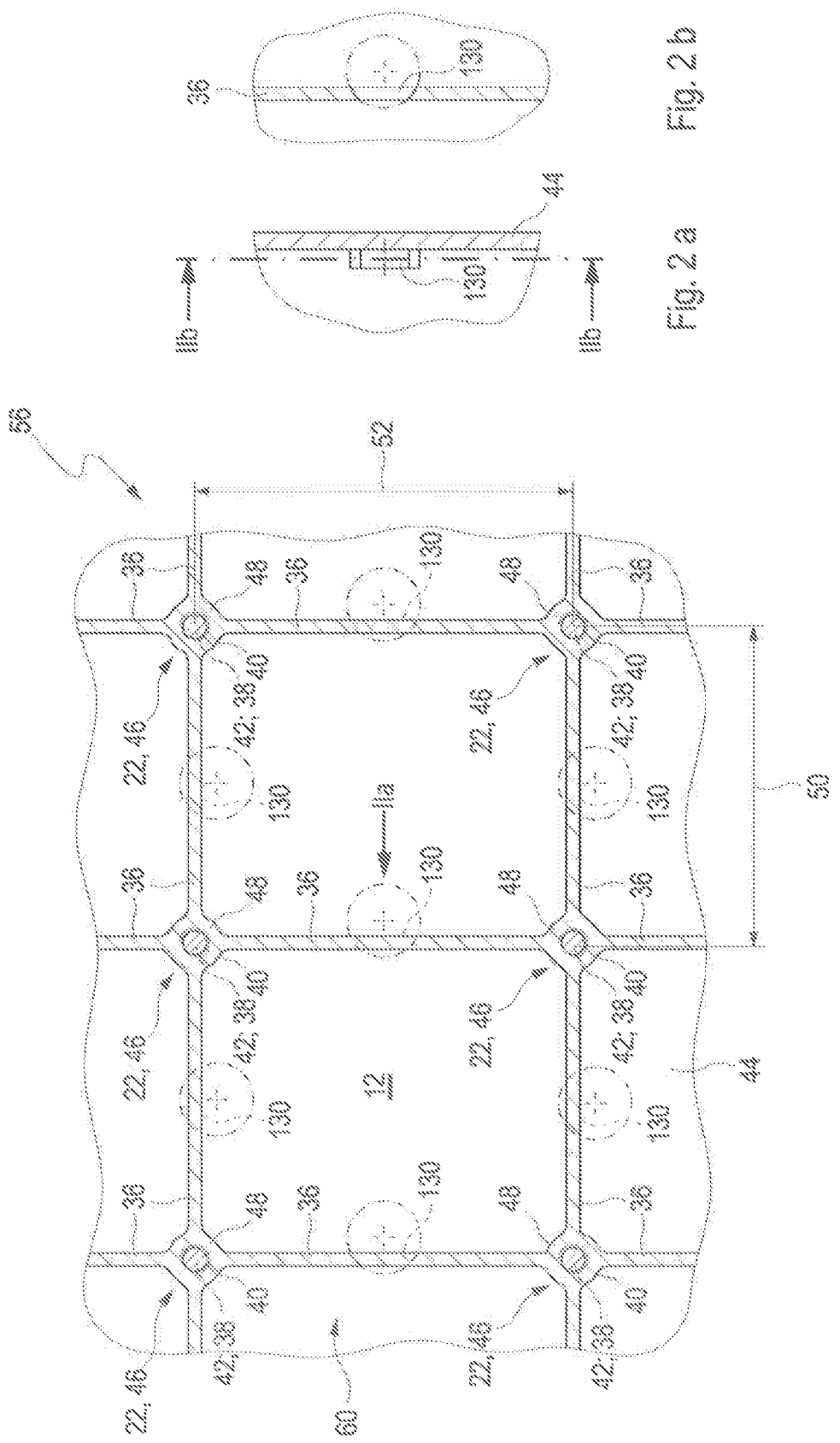

BLADDER-FREE FUEL TANK

This nonprovisional application claims priority under 35 U.S.C. §119(a) to European Patent Application No. 14189525.0, which was filed in Germany on Oct. 20, 2014, and which is herein incorporated by reference.

BACKGROUND OF THE INVENTION

Field of the Invention

The present invention relates to an additional fuel tank, particularly to a bladder-free fuel tank for aircraft applications in which the net volume to be occupied by fuel is maximized and mechanical stiffness of the bladder-free fuel tank is enhanced.

Description of the Background Art

U.S. Pat. No. 7,093,470 B2 is related to methods of making integrally stiffened axial load carrying skin panels for primary aircraft structure and fuel tank structures. According to U.S. Pat. No. 7,093,470 B2, a method of making a skin panel is disclosed according to which a starting plate is machined to a final part geometry including a skin and at least one integral stiffener machined into the plate and extending generally outwardly from the skin. Further, an explosive forming of the machined plate is performed with its integral stiffener against a forming surface of a rigid dye having a contour which at least substantially is in accordance with the desired curvature for the skin panel, the explosive forming causing the machined plate to substantially conform to the contour of the forming surface to at least one of an uniaxial curvature and a biaxial curvature. Stiffening features are ribs, stiffeners, stringers, frames outer chords and the like.

WO 2007 121969 A1 is related to an inner container surrounded by an outer container used for receiving a cryogenic liquid. Disclosed is a flat inner container, especially an internal tank for a road vehicle which is surrounded by an outer container and is used for receiving a cryogenic liquid, particularly fuel. The inner container is characterized by a combination of the following features: A longitudinally extending monolithic base with a top wall and a bottom wall, which are connected to also longitudinally extending sidewalls and with at least two longitudinally extending, substantially straight webs that connect the bottom wall to the top wall so as to form at least one longitudinally extending chamber. The chamber is arranged between the webs extending along the entire length of the base as well as from the bottom wall to the top wall and has a predetermined width between the webs. At least two caps tightly seal the two open ends of the base at the periphery. The top wall and/or the bottom wall is/are provided with an arch relative to a planar reference top wall and/or reference bottom wall, the distance of the arch between the inner contour of the top wall and/or the bottom wall and the planar reference top wall and/or bottom wall amounting to less than 30% of the width of the chamber in the center between the webs.

US 2012/0181288 A1 is related to a tank having integral restraining elements and an associated fabrication method. According to US 2012/0181288 A1 a tank and an association fabrication method are disclosed which may limit the damage otherwise occasioned by the impact of a ballistic projectile. The tank may include a wall assembly defined between outer and inner walls and a plurality of restraining elements that extend between the walls. The restraining elements may be formed to have a plurality of layers of material that form not only the restraining element but also portions of the inner and/or outer walls. For example, the tank may include a plurality of cells positioned adjacent to one another with each cell forming portions of two adjacent restraining elements and portions of the inner and/or outer walls. A corresponding method for fabricating a tank including a wall assembly having a plurality of restraining elements is also provided.

U.S. Pat. No. 7,090,167 B2 is related to a method and apparatus for liquid containment such as for aircraft fuel vessels. A vessel can include a first surface portion, a second surface portion spaced apart from the first surface portion and a core positioned between the first and second surface portions. The core can be sealably connected to the first and second surface portions and can be positioned to carry a load from at least of the first and second surface portions to the other. The core can include a plurality of cells separated by cell walls, at least some of which have wall openings positioned to provide liquid communication between adjacent cells.

U.S. Pat. No. 8,550,403 B2 is related to an aircraft fuel tank. An aircraft fuel tank is capable of suppressing electrostatic charging of for example by flow electrification with the fuel. The aircraft fuel tank comprises an upper skin and a lower skin that exhibit conductivity and form a portion of a container for storing fuel, an internal structure formed from metal and an inner surface layer which has semiconductor properties or insulating properties and is formed in an integral manner on the inner surfaces of the upper skin and the lower skin in the location where the internal structure contacts the upper skin and the lower skin, as well as in the surrounding portion thereof, wherein the inner surface layer is formed at least in the surround portion from a material having semiconductor properties.

EP 2 048 079 A2 is related to a fuel tank assembly in an associated method. A fuel tank assembly and associated method are provided which may limit the damage otherwise occasioned by the impact of a ballistic projectile. The fuel tank assembly may include a bladder defined between interior and exterior bladder walls, with the interior bladder wall defining a volume for storing fuel. The exterior bladder wall is at least as more rigid than the interior bladder wall. The fuel tank assembly can also include connectors between the exterior and interior bladder walls to at least partially limit the expansion of the bladder. The fuel tank also includes an inlet opening to the bladder to permit a pressurized gas to be introduced into the bladder. The fuel tank assembly may also include a valve through the interior bladder wall into the volume for storing fuel to permit at least some of the pressurized gas to be introduced therein.

U.S. Pat. No. 5,320,247 is related to storage tanks with internal support ribs. A method of forming a storage tank from an existing matrix tank comprises adding spaced internal support ribs. The interior surface of the matrix tank is covered with a layer of fibrous reinforced resinous material to form a main body and internal support ribs are added. The main body and support ribs are secured together such that the ribs protrude inwardly. The formed tank is fully and independently capable of containing liquid and withstanding normal internal and external load forces. A double walled formed storage tank system is also provided wherein an inner wall between or on the internal support ribs is added.

Fuel tanks and/or additional fuel tanks such as additional center tanks for aircraft applications having bladders integrated therein are manufactured very costly and constitute a compromise in view of the factors weight, production and maintenance costs and in view of integration of in-fuel-tank equipment. Further, the use of a bladder in a fuel tank comes along with a loss of usable tank volume. Known honeycomb-structured tanks suffer the drawback of being applicable only subject to specific design, production and maintenance know-how to create an additional fuel tank or a fuel tank for an aircraft application with acceptable costs and economical risk.

SUMMARY OF THE INVENTION

It is therefore an object of the present invention to provide for a fuel tank, particularly a bladder-free fuel tank having an enhanced rigidity.

A further object of the present invention is to provide for a bladder-free fuel tank, having an enhanced fuel storage capacity.

A still further object of the present invention is to provide for a fuel tank having a reduced weight, particularly for aircraft applications.

According to an exemplary embodiment of the present invention a fuel tank, particularly a bladder-free fuel tank is provided, having a reservoir on its inside area limited to an outside area by a double-walled structure wherein the double-walled structure comprises an outer wall and an inner wall, a rib structure of a plurality of ribs extending inwardly into the inside area from the double-walled structure.

The bladder-free fuel tank according to the present invention provides for a storage capacity for a maximum of fuel volume since no bladder is present in the inside area of the bladder-free fuel tank according to the present invention. Still further, the rigidity of the bladder-free fuel tank according to the present invention is enhanced significantly since the inwardly extending rib structure provided within the interior of the bladder-free fuel tank increases the mechanical rigidity thereof significantly. Due to the lack of a bladder the double-walled structure, limiting the interior of the tank of the surrounding, can be placed closer to the outside of the bladder-free fuel tank, i.e. closer to or almost on the edge of a ground-plate having e.g. a rectangular or a squared shape. Thus, the storage volume of fuel within the bladder-free fuel tank according to present invention is maximized.

According to an embodiment the present invention, the double-walled structure comprises an outer wall or outer wall segments being manufactured from a material including aluminum and the outer wall or outer wall segments being manufactured as a sheet metal part. Still further, the double-walled structure of the bladder-free fuel tank according to the present invention comprises an inner wall and/or inner wall segments which are machined or milled components being made from a material, aluminum for example.

The components of the double-walled structure can be fixed to one another by means of a spacer which on the one hand defines a width of the hollow interior between the components of the double-walled structure and on the other hand is arranged in mounting areas for fixture elements having a sealing means assigned thereto such as screws, bolts or other kinds of fixture elements. By means of the fixture elements the components, i.e. the inner wall, the outer wall, inner wall segments and/or outer wall segments are fixed to one another providing a mechanical rigid compound able to withstand tension-, pressure-, bending- and shear-stresses generated during operation of the bladder-free fuel tank according to the present invention. The width of the hollow interior of the double-walled structure can be between 3 mm to 10 mm, which is sufficient for drain and venting purposes of the bladder-free fuel.

The inwardly extending rib structure constitutes a reinforcing structure which either can be manufactured as separate components, which are to be fastened to the inner wall or to inner wall segments of the double-walled structure by fixture elements. On the other hand, the inwardly extending rib structure can be manufactured in a one piece embodiment, i.e. the inner wall or inner wall segments and the inwardly extending rib or the inwardly extending rib structure is a one-piece component, thereby significantly enhancing mechanical rigidity of the bladder-free fuel tank according to the present invention.

In an embodiment, a rib-structure pattern of the inwardly extending ribs, i.e. into the interior of the bladder-free fuel tank, may be shaped as a cross-link structure, diagonal-link pattern structure or a parallel-link pattern structure. The inwardly extending rib structure being present in the interior of the fuel tank according to the present invention is linked to a ground plate of the bladder-free fuel tank by mechanical elements. By means of inner tied rods for example, neighboured wall structure sections or in particular oppositely arranged sections of the double-walled structure are connected, thus enhancing significantly mechanical rigidity of the bladder-free fuel tank according to the present invention. Still further, the plurality of inwardly extending ribs may comprise buckling resistant T-shaped or L-shaped extensions which are fastened on the surface of the ground plate of the bladder-free fuel tank according to the present invention.

The double-walled structure can be arranged without interruptions along the entire circumference of the ground plate of the bladder-free fuel tank according to the present invention. In overlapping regions with respect to the outer wall and the inner wall of the double-walled structure of the bladder-free fuel tank, edge portions of outer wall segments overlap each other and are sealingly connected via fixtures such as screws or bolts or the like. Alternatively, within overlapping regions of outer wall segments a sealing connection between the outer wall segments is obtained by welding such as automatic laser welding. Also, within overlapping regions of inner walls segments a sealing connection between the inner wall segments is obtained by welding such as automatic laser welding to give an example. In a further advantageous embodiment of the bladder-free fuel tank according to the present invention, edge portions of inner wall segments within an overlapping region are embedded in recesses of corresponding inner wall segments so that upon interconnection of the edge portion in the presence of a sealing means a substantially flat outer surface of the inner wall or inner wall segments towards the hollow interior of the double-walled structure is obtained.

The bladder-free fuel tank according to an embodiment of the present invention may contain local strengthenings or machine-milled components. Instead of the use of spacers to define the width of the hollow space of the double-walled structure in the outer wall or inner wall or outer wall segments and/or inner wall segments dome-shaped elements can be manufactured therein upon production thereof, thus defining a width of the hollow space of the double-walled structure as well as constituting a mounting area of the fixture elements such as screws and bolts or the like.

In an embodiment of the bladder-free fuel tank according to the present invention, the inwardly extending rib structure can be manufactured in a height which is close to the height of the components e.g. slosh walls of the double-walled structure to prevent excessive sloshing of fuel within the interior of the bladder-free fuel tank according to the present invention.

Still further, the present invention relates to the use of the bladder-free fuel tank as additional center tank for aircraft applications.

The bladder-free fuel tank according to an embodiment of the present invention as will be described in further detail herein below comes along with a number of significant advantages. It deserves mentioning that the bladder-free fuel tank according to the present invention is bladder-free so that consequently the weight of the bladder is no longer a significant fact. Since the bladder structure does not contribute to the mechanical strengthening of the additional center tank, the bladder has the disadvantage to contribute to additional weight only. By means of the present invention this major drawback is eliminated.

The cost for a bladder can be saved as well as mounting and maintenance costs. Since the interior of the bladder-free fuel tank according to the present invention is no longer occupied by a bladder, and in particular since the stiffening ribs are extended inwardly which allows to significantly increase the wettable tank volume, the usable capacity of the interior of the bladder-free fuel tank according to the present invention is significantly optimized. Still further, the double-walled structure of the bladder-free fuel tank according to the present invention is suitable for reliable production and mounting methods since the components such as sheet metal parts and milled components are reliable to manufacture. In case the components are made of light-weight materials such as aluminum, however, providing for a significant mechanical rigidity, such materials are easy to manufacture in view of the portion of loss of material during production, forming and milling, respectively.

The double-walled structure is relatively easy to maintain, the surface protection versus corrosion is safe, the bladder-free fuel tank according to the present invention can very easily be connected into an already existent fuel supply system. Since no bladder is present in the bladder-free fuel tank, in-fuel-tank equipment is relatively easy to mount—e.g. directly to mechanical interfaces machined into the inner wall and without to require a separate bracket or fixture. When compared to solutions according to the prior art the number of openings in the double-walled structure for maintenance purposes or for e.g. integration gauge probes is minimized. In the interior of the bladder-free fuel tank according to the present invention, the inwardly extending ribs connected to the inner wall or inner wall segments of the double-walled structure are connected to each other by additional riveted ribs or by one or several tie rods, which may be arranged in the interior of the bladder-free fuel tank alternatingly. The weight of the bladder-free fuel tank according to the present invention is minimized by means of the high stress load resistance double-walled structure and furthermore when manufactured from materials including aluminum or magnesium. The rigidity of the bladder-free fuel tank according to the present invention is enhanced in case the inwardly extending ribs or a relevant number of them are made in a sufficient height in order to prevent excessive sloshing of fuel. The inwardly extending ribs may additionally serve as anchoring points for inner tie rods or compression struds, or may serve as connecting points of separate slosh walls which also may act as functionally integrated tie-rods.

The ground plate of the bladder-free fuel tank according to the present invention is no longer covered by the bladder which does not contribute to mechanical stiffness and causes weight only. The bladder-free fuel tank according to the present invention has in its interior inwardly extending ribs, thus enhancing rigidity while an outer space envelope is not influenced by the ribs now integrated into the interior of the bladder-free fuel tank according to the present invention. Since the ribs are now present in the interior of the tank, the surrounding of the bladder-free fuel tank according to the present invention is free of reinforcing structures such as ribs. According to the present invention a shifting of the double-walled structure to a maximum space envelope is achieved so that the storage capacity of the bladder-free fuel tank according to the present invention is enhanced significantly when compared with fuel tanks using a bladder. By means of the present invention a significantly improved usable fuel to tank structure ratio can be obtained as well as a significantly improved ratio between usable fuel to tank outline volume when compared with prior art solution. Still further, the ratio between the usable fuel to the tank manufacturing cost can be significantly improved by the use of the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 1 shows a cross section through a double-walled structure having an outer wall and an inner wall with inwardly extending reinforcing ribs;

FIG. 1.1 shows an embodiment of a fixture and a dome present on the inner wall or the inner wall segment;

FIG. 1.2 shows an embodiment of a fixture element, connecting an inner wall and an outer wall of the double-walled structure;

FIG. 2 shows an embodiment of a rib pattern present in the interior of the bladder-free fuel tank according to the present invention;

FIGS. 2a and 2b show details of milled pockets machined in the inwardly extending ribs;

DETAILED DESCRIPTION

FIG. 1 shows a cross section through a double-walled structure of the bladder-free fuel tank according to the present invention.

Figure 3:
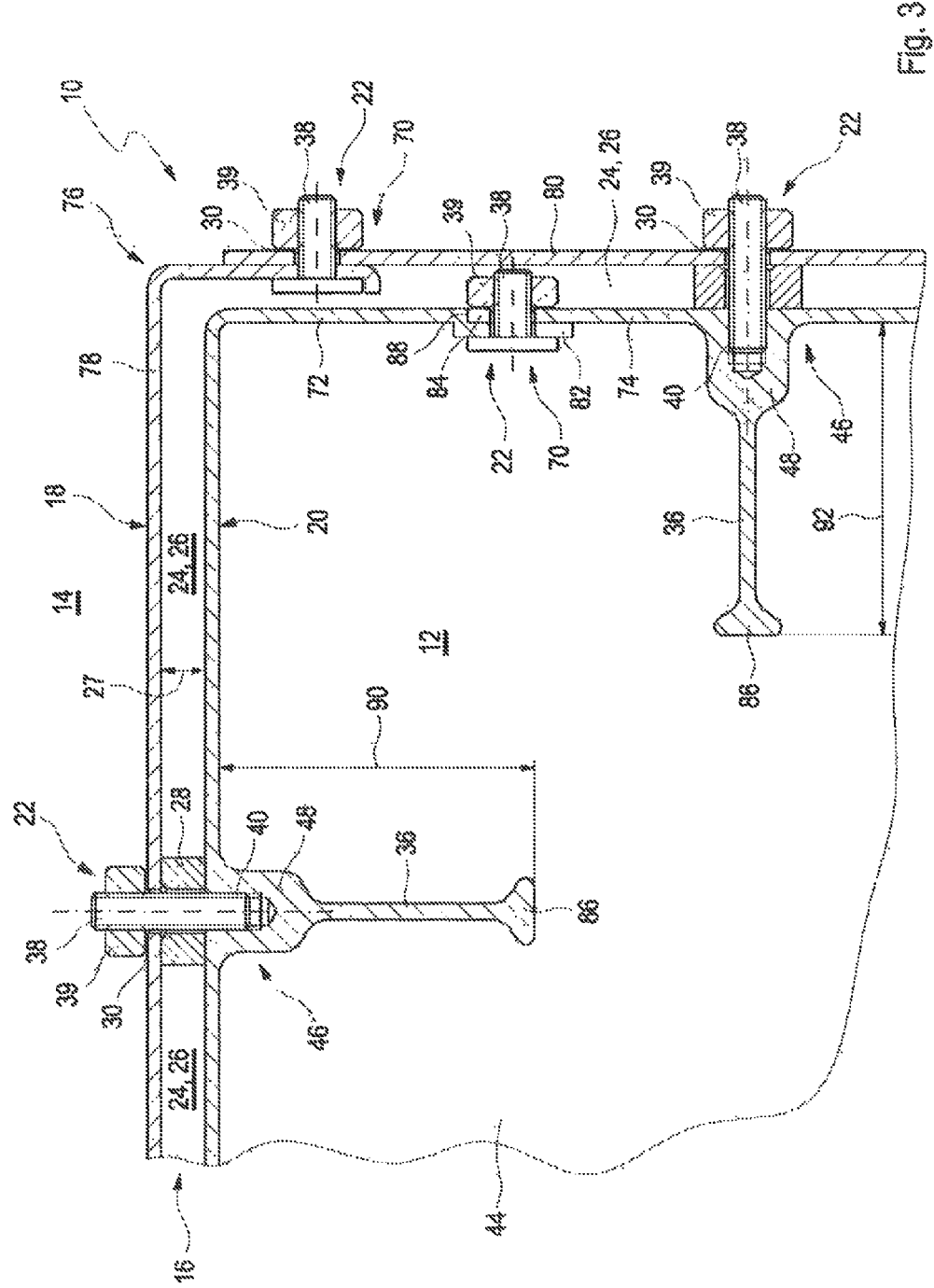
FIG. 3 shows a cross-section of the double-walled structure with overlapping regions present in the inner wall and the outer wall.

A bladder-free-fuel tank 10 has an inside area 12 which is limited from an outside area 14, i.e. the surrounding, by a double-walled structure 16. The double-walled structure 16 may comprise an outer wall 18 and an inner wall 20 or may comprise—as best shown in FIG. 3—a first inner wall segment 72, a second inner wall segment 74 interconnected to each other. The outer wall 18 may comprise a first outer wall segment 78 and a second outer wall segment 80, likewise best shown in FIG. 3.

As can be derived from the cross-section according to FIG. 1, the double-walled structure 16 of the bladder-free fuel tank 10 according to the present invention comprises a number of fixture elements 22 such as bolts 38 or screws 42, respectively, by means of which the outer wall 18 and the inner wall 20 are fixed to one another. The double-walled structure 16 according to FIG. 1 comprises a hollow space 26 established between the outer wall 18 and the inner wall 20. The hollow space 26, the width 27 of which is defined by a spacer 28 or in the alternative by dome-shaped elements 34 present the inner wall 20, serves as a drain- or vent-channel of the bladder-free fuel tank 10 according to the present invention. Each fixture element 22 being mounted in a mounting region of the double-walled structure 16 may comprise a sealing 30, a sealing ring 32 for instance.

As can be derived from the cross-section according to FIG. 1, inwardly extending ribs 36 are present, which extend from the inner wall 20 of the double-walled structure 16 in direction to the inside area 12 of the bladder-free fuel tank 10 according to the present invention. The inwardly extending ribs 36, which form a rib structure, a rib pattern 56, see FIG. 2, may be part of a machine-milled inner wall 20 or of machine-milled inner wall segments 72, 74, respectively, as best shown in FIG. 3. In the alternative, the inwardly extending ribs 36 shown in FIG. 1 extend into the inside area 12, i.e. the interior of the bladder-free fuel tank 10 according to the present invention enhancing rigidity and mechanical stiffness of the bladder-free fuel tank 10. Instead of a one-part component, i.e. the inner wall 20 and the inwardly extending ribs 36 being a one-part arrangement, the inwardly extending ribs 36 may constitute separate components which are fastened to the inner wall 20 or to machine-milled inner wall segments 72, 74, respectively, of the double-walled structure 16.

In the mounting areas, i.e. in the region where the fixture elements 22, i.e. screws 42 or bolts 38 are present, a threaded connection 40 is established between the outer wall 18 and the inner wall 20. Since the inner wall 20 or respective inner wall segments 72, 74 are machine-milled, the respective threadings for establishing a threaded connection 40 can be milled or drilled upon production of the respective inner wall 20 or the respective inner wall segment 72, 74 respectively, as best shown in FIG. 3.

As shown in FIG. 1, the double-walled structure 16 is a compound comprising an inwardly arranged inner wall 20 being machine-milled, i.e. a milled component and an outwardly arranged sheet metal part. Both components, i.e. the outer wall 18 and the inner wall 20, are made from a material including aluminum. In the embodiment given in FIG. 1 the inner wall 20 and the outer wall 18 are spaced from one another by spacers 28 establishing a width 27 of the hollow space 26 of the double-walled structure 16.

Both walls, i.e. the outer wall 18 and the inner wall 20 of the double-walled structure 16, are fastened to one another in order to endure tension, pressure, bending and shear forces by being gradually deformable, providing a high mechanical rigidity. The drain and vent channel 24 within the double-wall structure 16 has a width 27 of a few millimeters only.

FIG. 1.1 shows a fixture element of the double-walled structure in greater detail.

According to the exemplary embodiment given in FIG. 1.1 the inner wall 20 comprises a dome element 34 serving as support for the threaded connection 40. As can be derived from FIG. 1.1 the height of the dome element 34 defines the width 27 of the hollow space 26 between the outer wall 18 and the inner wall 20 of the double-walled structure 16 of the bladder-free fuel tank 10. As can be derived from FIG. 1.1 the fixture element 22 is a screw having a washer-type sealing ring 32 performing a sealing function. In inward direction, i.e. in direction of the inside area 12 of the bladder-free fuel tank 10 according to the present invention, the inwardly extending rib 36 is shown having both sides milled.

FIG. 1.2 shows an alternative embodiment of a fixture element of the double-walled structure.

As can be derived from FIG. 1.2 the fixture element 22 is rather a bolt 38 than a screw 42 as shown in FIG. 1.1. In the mounting area of the double-walled structure 16 the bolt 38 fixes the outer wall 18 to the respective inner wall 20 provided with dome-shaped elements 34 defining the width 27 of the hollow space 26 of the double-walled structure 16. As can be derived from FIG. 1.2 in this embodiment, the inner wall 20 of the double-walled structure 16 and the inwardly extending rib 36 constitute a one-piece embodiment. The sealing 30 according to the embodiment given in FIG. 1.2 is achieved by means of a washer-type sealing ring 32.

FIG. 2 shows a rib pattern present in the inside area of the bladder-free fuel tank 10 according to the present invention.

The cross-section given in FIG. 2 shows a section of a rib pattern 56 within which the inwardly extending ribs 36 are arranged in a rectangular pattern. Each of the inwardly extending ribs 36 is orientated in a 90°-degree orientation within the rib pattern 56 as given in FIG. 2. The inwardly extending ribs 36 of the rib pattern may have a first length 50 and a second length 52 which may differ from one another or may be equal with respect to one another. A ratio between the first distance 50 and the second distance 52 as shown with respect to the length of the inwardly extending ribs 36 may vary.

In FIG. 2, the rib pattern 56 nearly is a square-shaped pattern, however, different patterns for instance x-cross pattern, diagonal rib pattern 58 or parallel rib pattern 60 may be feasible as well. In local thickenings 48 quantities of additional material are provided to reduce any stress level during operational material deflection below a crack-propagation level, resulting in an effective crack stop design. The rib pattern 56 given in FIG. 2 is arranged such that a crossing of two ribs 56 corresponds to fixture elements 22. In the top view given in FIG. 2, a section of the interior of the inside area 12 of the bladder-free fuel tank 10 according to the present invention is shown. The inwardly extending ribs 36 may comprise buckling resistant T-shaped extensions preventing expansions 86.

FIGS. 2a and 2b, respectively, show details of machine-milled pockets provided in the inwardly extending ribs 36.

According to the details given in FIGS. 2a and 2b, respectively, the inwardly extending ribs 36 are provided with milled pockets 130. The milled pockets 130 form openings in the inwardly extending ribs 36 to allow for the flow of fuel between different compartments arranged in the interior of the bladder-free fuel tank 10 according to the present invention. By means of the milled pockets 130 a uniform, homogeneous fuel level can be established within all compartments within the interior of the bladder-free fuel tank 10 according to the present invention.

FIG. 3 shows a cross-section through a double-walled structure 16 in the region of a 90°-degree bow 76.

According to FIG. 3, the double-walled structure 16 of the bladder-free fuel tank 10 according to the present invention comprises overlapping regions 70. To prevent mechanical stress, the overlapping regions 70 are arranged not directly within a 90°-degree bow 76 but rather in straight portion of the double-walled structure 16. As can be derived from the top view given in FIG. 3, the double-walled structure 16 with respect to the outer wall 18 and the inner wall 20, respectively, comprise the overlapping regions 70 within which either inner wall segments 72, 74 contact one another and/or outer wall segments 78, 80, respectively, are interconnected with one another. Within the overlapping regions 70 respective edge portions 82, 84 of the first inner wall segment 72 and the second inner wall segment 74 are interconnected with one another by means of a fixture element 22. The overlapping regions 70 may comprise the first outer wall segment 78 and the second outer wall segment 80 overlapping each other or as likewise shown in FIG. 3 may comprise an overlapping region 70 within which one edge portion 82 of a first inner wall segment 72 is embedded in a recess 88 of a corresponding edge portion 84 of the second inner wall segment 74, respectively. In the second alternative, a flat surface of the inner wall 20 towards the hollow space 26 present within the double-wall structure 16 is achieved.

Within the overlapping regions 70 the edge portions 82, 84, respectively, may be interconnected either via fixture elements 22 such as bolts 38 or screws 42 having a sealing 30 such as a sealing ring 32. In the alternative, within the overlapping regions 70 the edge portions 82, 84, respectively, may be sealingly interconnected with each other by means of automatically performed laser welding or the like.

Within the overlapping regions 70 likewise edge portions of outer wall segments 78, 80, respectively, may be interconnected either via fixture elements 22 such as bolts 38 or screws 42 having a sealing 30 such as a washer-type sealing ring 32. In the alternative, within the overlapping regions 70 the edge portions may be sealingly connected with each other by means of automatically performed laser welding or the like.

Within the 90°-degree-bow 76 according to FIG. 3, a local strengthening of the milled component is achieved. As can be seen in the cross-section view given in FIG. 3, the inwardly extending ribs 36 may comprise broader buckling resistant T-shaped or L-shaped extensions 86 fastened or not fastened to a ground plate 44 onto which the double-walled structure 16 of the bladder-free fuel tank 10 sealingly is mounted.

Figure 5:
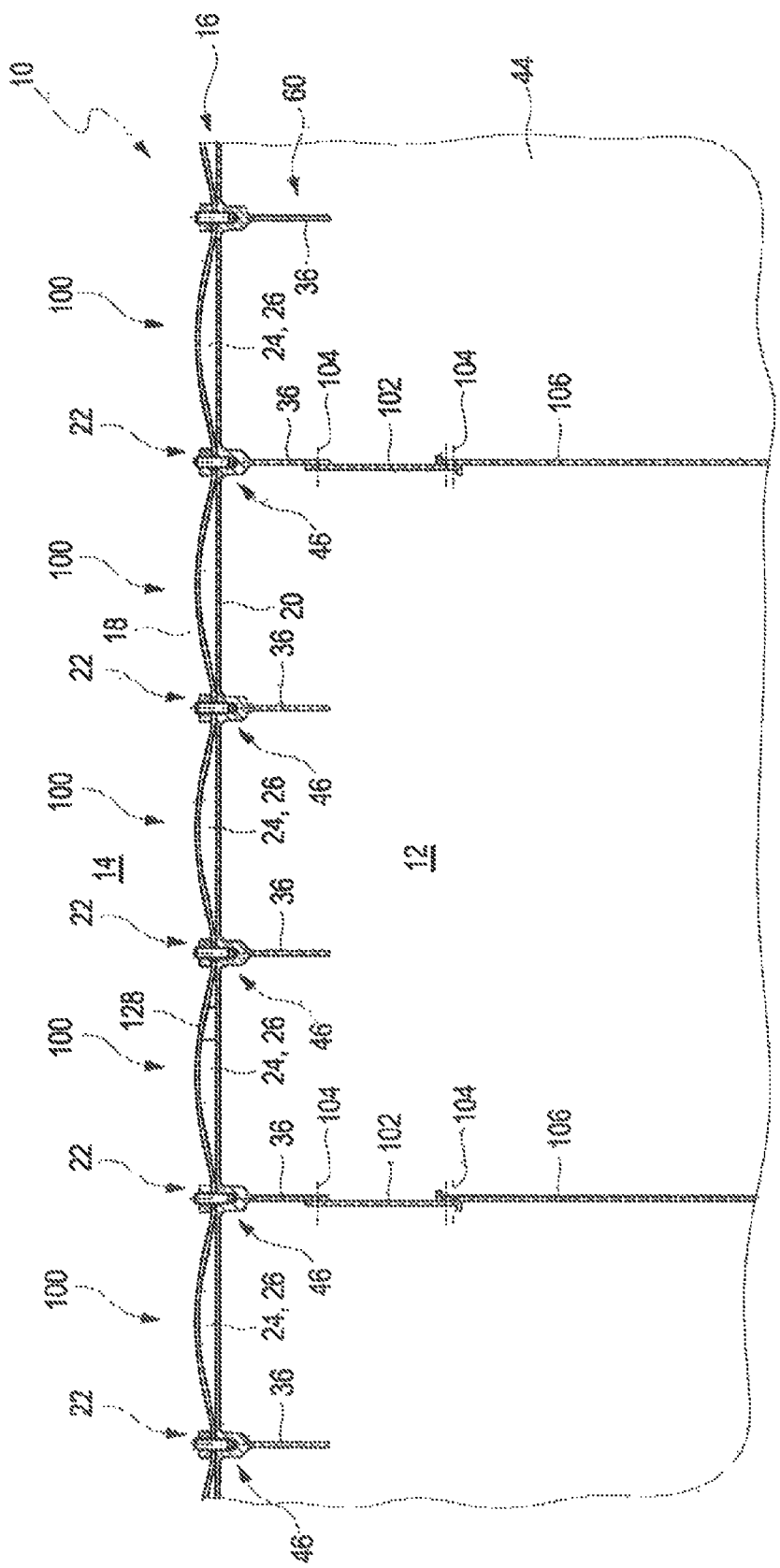
FIG. 5 shows a top view of a large additional riveted rib and a part of a tie rod inside the bladder-free fuel tank.
Figure 7:
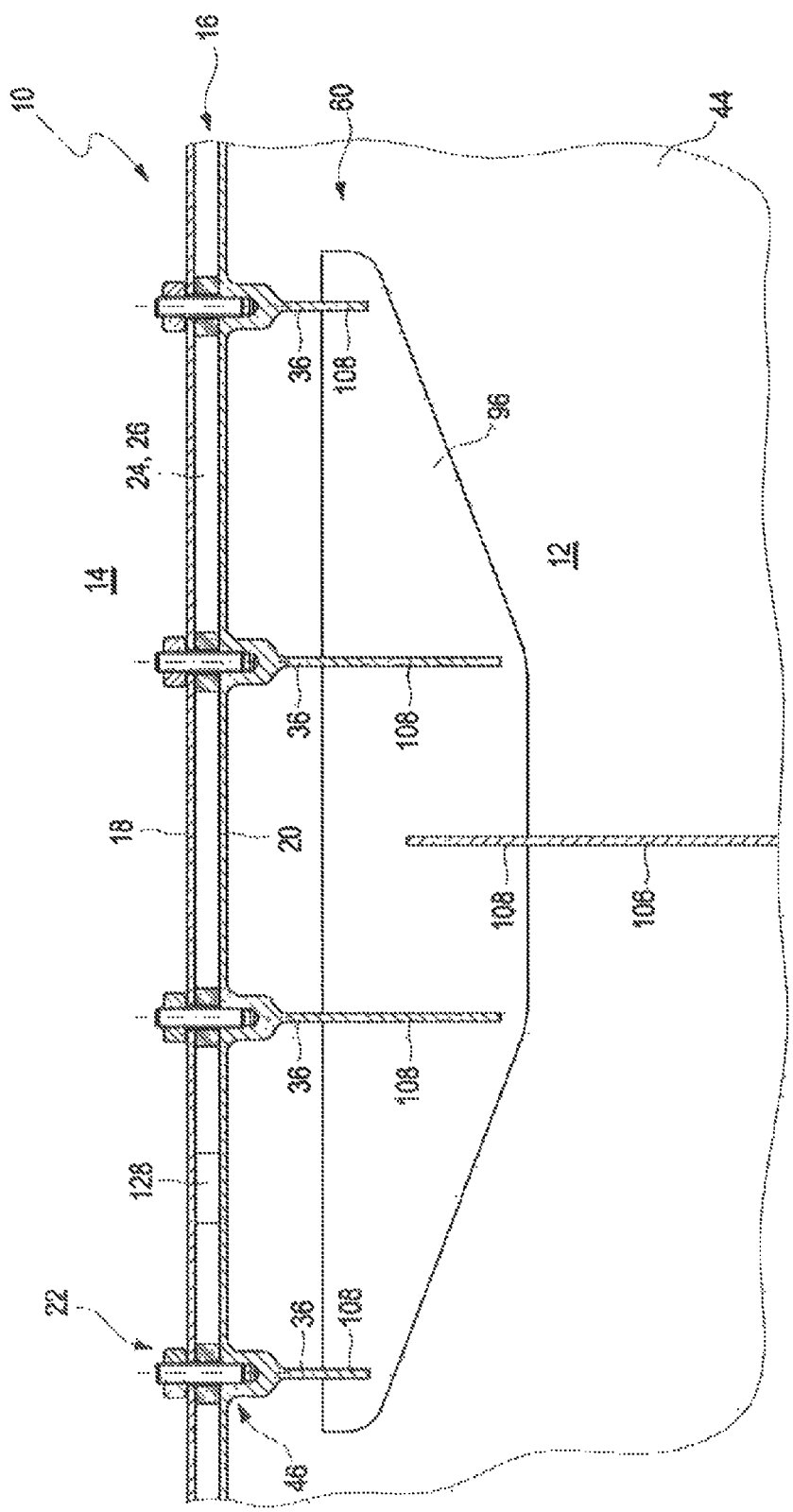
FIG. 7 shows an embodiment of a plurality of force transmission points arranged between the double-walled structure and a part of an inner tie rod.

According to an exemplary embodiment of the present invention the ground plate 44 is sealingly fixed to the double-walled structure 16 of the bladder-free fuel tank 10 according to the present invention. Thus, a continuous interruption-free circumferentially extending double-walled structure 16 is established thereby maximizing the capacity of the reservoir in the interior of the bladder-free fuel tank 10 according to the present invention. Still further—however not shown in the embodiments given in FIG. 3—inner tie rods 106 or compression struts 110 may be present, preferably arranged between neighbouring or oppositely arranged sections 112 of the double-walled structure 16. By means of the inner tie rods 106 an inner pressure imposing a local mechanical load on the double-walled structure 16 is reduced significantly. The inner tie rods 106 may be connected to the inwardly extending ribs 36 by means of bolts 38 or screws 42. Plate-shaped connectors 96 as best shown in connection with FIG. 7 are arranged between the inwardly extending ribs 36 and the inner tie rods 106 (shown in FIGS. 5 and 7), thus allowing for a connection of oppositely arranged sections 112 of the double-walled structure 16 providing a plurality of force transmission points 108, as best shown in FIGS. 5 and 7, respectively.

Figure 6:
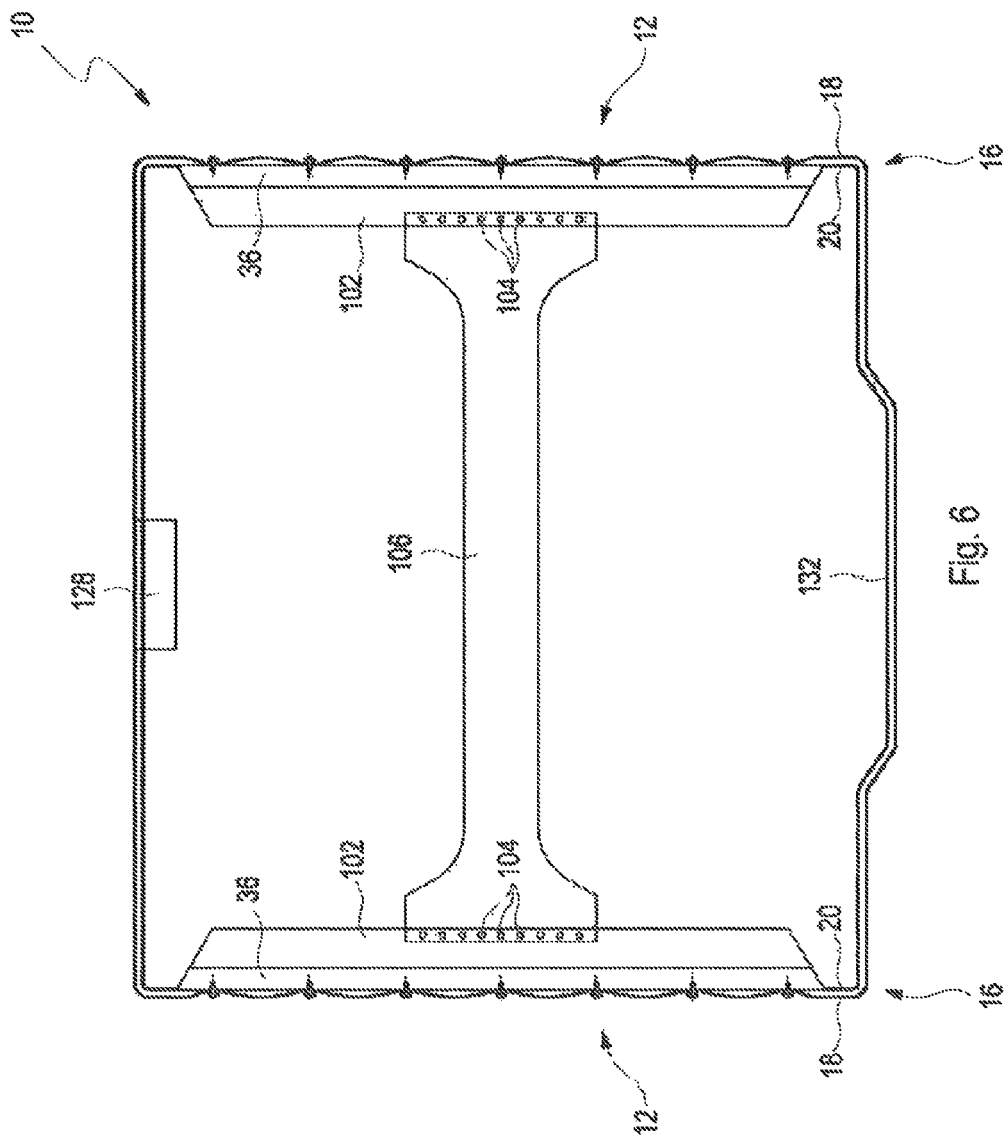
FIG. 6 shows a side view of a fuel tank according to the present invention.

The inwardly extending ribs 36 as shown in FIGS. 1, 2 and 3 are made in a height 90, 92 corresponding to the height of the double-walled structure 16, and/or large additional e.g. riveted ribs 102 as best shown in FIG. 6 and/or tie rods made in a height, so that the inside area 12 of the bladder-free fuel tank 10 according to the present invention as precautionary measure is protected against excessive sloshing of fuel. According to the present invention the fixture elements 22 may be realized by the bolts 38 or the screws 42 establishing the threaded connection 40 between the outer wall 18 and the inner wall 20 of the double-walled structure 16. Alternatively, the fixture elements 22 may be realized as shear-sleeves including a threaded connection. By means of local deepened drawing of the sheet metal part, i.e. the outer wall 18, a forming of a flat-shaped deepening is performed, followed by a subsequent connection with the shear sleeves and/or a spacer such as a washer.

Figure 4:
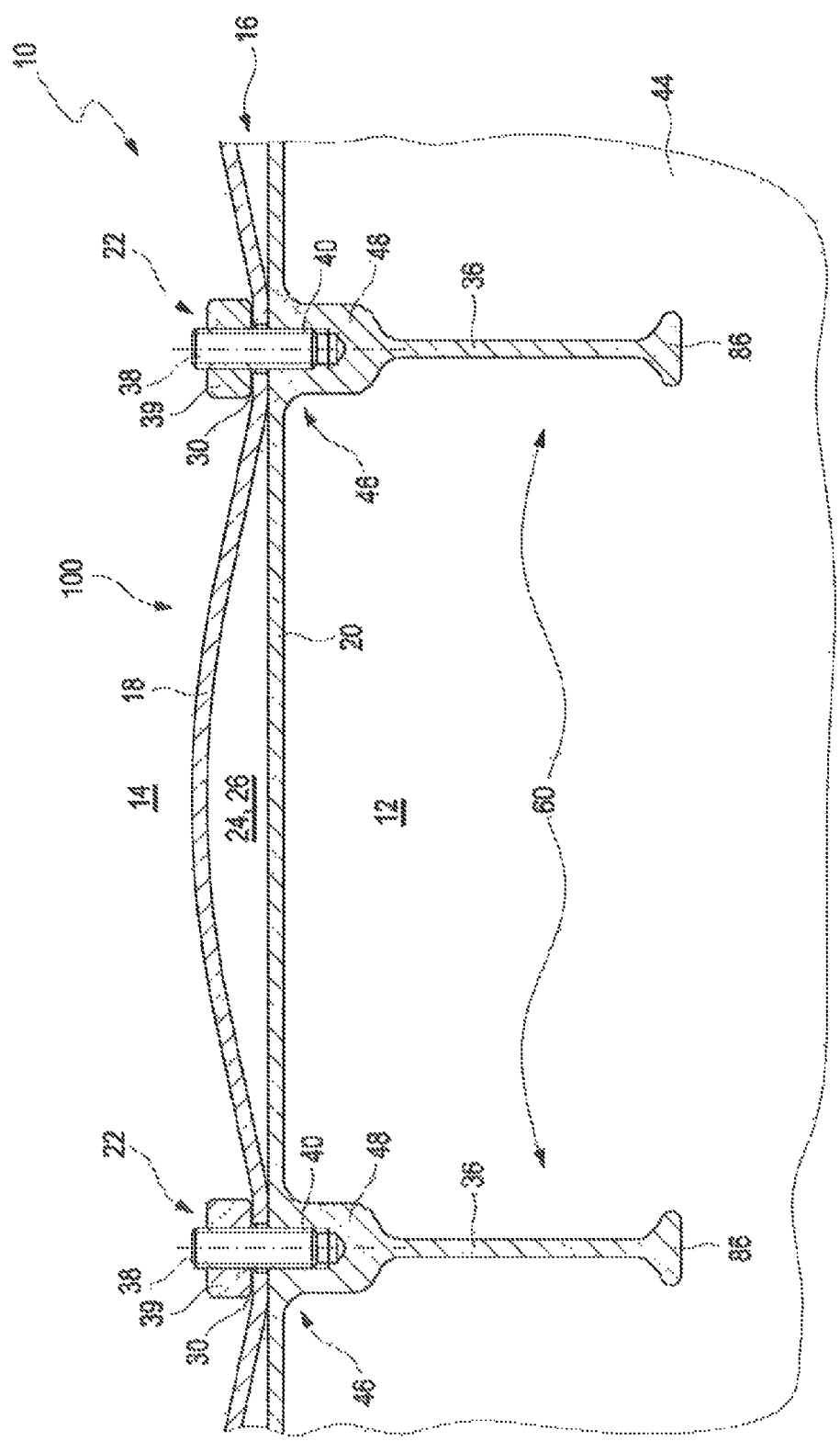
FIG. 4 shows the double-walled structure with fixture elements mounted in mounting areas of the fixtures and the resulting and a formed outer wall of the double-walled structure of the bladder-free fuel tank.

FIG. 4 shows a top view of a cross-section through the double-walled structure 16, fixture elements 22 mounted in mounting areas 46 thereof. As can be derived from embodiment given in FIG. 4, the outer wall 18 of the double-walled structure 16 is bulged by arrangements of fixture elements 22 in the region of the respective mounting areas 46 against the inner wall 20 of the respective double-walled structure 16. Thus within the bulging regions 100 of the outer wall 18 the hollow space 26 defining the drain- or vent channel 24 is locally interrupted.

In the embodiment given in FIG. 4 the fixture elements 22 are screws 42 which establish a threaded connection 40 to respective threadings arranged in local thickenings 48 of the inner wall 20. In the embodiment given in FIG. 4 the inner wall 20 of the double-walled structure 16 and the inwardly extending ribs 36 are a one-part-embodiment. The inwardly extending ribs 36 may have one milled side or may have both sides milled.

The sealing of the double-walled structure 16 is achieved by the machine-milled inner wall 20, which in the overlapping regions 70 as best shown in FIG. 3 has a sealing 30 such as sealing paste or the like. Still further, the sealing 30 of the inside area 12 of the bladder-free fuel tank 10 according to the present invention is established by interconnected edge portions 82, 84, respectively, of first and second inner wall segments 72, 74, respectively. A sealing 30 between the ground plate 44 and the double-walled structure 16 of the bladder-free fuel tank 10 is likewise realized by circumferentially extending sealing means. The connection of the ground plate 44 and the double-walled structure 16 of the bladder-free fuel tank 10 according to the present invention is performed likewise to the connection between according to FIG. 3 or 13, respectively.

The bladder-free fuel tank 10 according to the present invention comprises a rigid connection of the outer wall 18 or outer wall segments 78, 80, respectively with the inner wall 20 or inner wall segments 72, 74 forming a rigid shear resistant structure which is subject to pressure differences between i.e. the inside area 12 and the outside area 14 of the bladder-free fuel tank 10. By means of the inwardly extending reinforcing ribs 36 and the inner tie rods 106 or compression struds 110, respectively, the bladder-free fuel tank 10 according to the present invention has a lower weight as compared to fuel tank arrangements having a bladder arranged within the interior.

The double-walled structure 16 as given in FIGS. 1, 3 and 4, respectively, may comprise openings for fittings allowing for double-walled openings for piping and electrical connections or openings for maintenance personnel for reasons of inspection. Still further, in the double-walled structure 16 openings may be present allowing for the installation of drain valves or the like. Still further, in the double-walled structure 16 elements may be integrated for the connection of fuel valves and the like without outer parts arranged within the outer space envelope of the bladder-free fuel tank 10. Still further, in-fuel-tank equipment such as valves, piping, sensors, pumps is arranged and can be fastened directly to the inwardly extending ribs 36 or the rib pattern arranged in the inside area 12 of the bladder-free tank 10.

FIG. 5 shows a top view of the double-walled structure 16 with assigned thereto large additional riveted ribs and a combination of large additional riveted ribs with tie rods connected thereto.

The cross-section according to FIG. 5 shows a double-walled structure 16, comprising the outer wall 18 and the inner wall 20. Within mounting area 46 fixtures elements 22, such as screws 42 or bolts 38 are connecting the outer wall 18 and the inner wall 20. As can be derived from the cross-section according to FIG. 5, the outer wall 18 has a somewhat bulged or buckled shape, limiting the drain- or vent-channel 24 within the hollow space 26 of the double-walled structure 16. The fixture elements 22, such as screws or bolts, are fixed to respective threadings, i.e. constituting a threaded connection 40. The corresponding threading is manufactured within local thickenings 48 of the inner wall 20. From the inner side of the inner wall 20 of the double-walled structure 16 the inwardly extending, reinforcing ribs 36 extend in direction to the inside area 12 of the bladder-free fuel tank 10 according to the present invention. As can be derived from FIG. 5, additional riveted ribs 102 are fastened to the inwardly extending ribs 36 extending into inward direction in the inside area 12 of the bladder-free fuel tank 10. The large additional riveted ribs 102 are connected via a rivet connection 104 for example, to an upright or to a horizontally extending portion of the inwardly extending ribs 36.

Still further, by means of a further riveted connection 104, a part or an entire tie rod 106 can be connected to the inwardly extending rib 36. The tie rod 106, a portion thereof given in FIG. 5, extends to an oppositely arranged double-walled structure 16 of the respective bladder-free fuel tank 10 as schematically shown in FIG. 6.

As can be seen in FIG. 5, e.g. every third of the inwardly extending reinforcing ribs is provided with a large additional rib 102 connected via a rivet connection 104.

FIG. 6 shows a bladder-free fuel tank 10 according to the present invention not to scale with an example of an inner tie rod.

As can be derived from this schematic view according to FIG. 6, two oppositely arranged double-walled structures 16 comprising inner walls 20 or first and second inner walls 72, 74, respectively. To each of the inner walls 20 a respective large additional e.g. riveted rib 102 is assigned. Via e.g. riveted connections 104 a tie rod 106 is fastened to both of the oppositely arranged large additional e.g. riveted ribs 102 at several force transmission points 108, which may be embodied likewise as e.g. riveted connections 104 as sketched in the schematic view according to FIG. 6. The inner tie rod 106 enhances mechanical rigidity of the bladder-free fuel tank 10 according to the present invention.

The fuel contained in the interior of the bladder-free fuel tank 10 is conveyed to a respective main tank of a fuel supply of an aircraft by means of a pressure difference. The pressure difference may result from the pressure difference between the outside air pressure of an aircraft when operated at flight level about 10 km and the cabin air pressure amounting to approximately 0.75 bar to 0.9 bar. By means of this pressure difference $\Delta p$ the fuel contained in the interior i.e. in the inside area 12 of the bladder-free fuel tank 10 is conveyed to the main fuel supply system for the engines of the respective aircraft. Thus, the interior, i.e. the inside area 12 of the bladder-free fuel tank 10 according to the present invention is pressure-loaded by the pressure provided e.g. by the cabin air and has to be designed such that the pressure for conveying the fuel present in the bladder-free fuel tank 10 according to the present invention imposes a load on the double-walled structure 16 of the bladder-free fuel tank 10. By means of the at least one tie rod 106 connecting opposingly arranged sections 112 of the double-walled structure 16, the mechanical rigidity of the bladder-free fuel tank 10 according to the present invention is enhanced significantly.

The tie rod 106 connecting the large additional riveted ribs 102 to one another may be made from sheet metal or another material. The fuel capacity of the bladder-free fuel tank 10 according to the present invention is typically at least ca. 1500 l and may of course contain larger volumes of aircraft fuel.

FIG. 7 shows a schematic view of an inner tie rod connected to a plate-shaped connector which internally is connected to inwardly extending ribs of the double-walled structure.

As can be derived from the schematic view given in FIG. 7, the inwardly extending reinforcing ribs 36 which are a part of the inner wall 20 of the double-walled structure 16, extend into the interior, i.e. the inside area 12 of the bladder-free fuel tank 10 according to the present invention. The inwardly extending reinforcing ribs 36 may have the same lengths or may have different lengths as shown in FIG. 7.

As schematically given in FIG. 7, a substantially plate-shaped connector 96 is connected to each of the inwardly extending reinforcing ribs 36 at a number of force transmission points 108. On the other hand, the plate-shaped connector 96 according to FIG. 7 is fastened at a further force transmission point 108 to a part of an inner tie rod 106 which internally is fastened to an oppositely arranged plate-shaped connector 96 fastened to an opposite section of the respective double-walled structure 16, however not shown in FIG. 7, of the bladder-free fuel tank 10 according to the present invention. The plate-shaped connector 96 may likewise be a sheet metal component made of aluminum or aluminum alloy, similar to the tie rod 106.

As an alternative to the tie rod arrangements shown in FIGS. 5, 6 and 7, respectively, at the interior, i.e. the inside area 12 of the bladder-free fuel tank 10 according to the present invention, may comprise compression struts 110 extending between sections of the double-walled structure 16 orientated opposite to one another.

Figure 8:
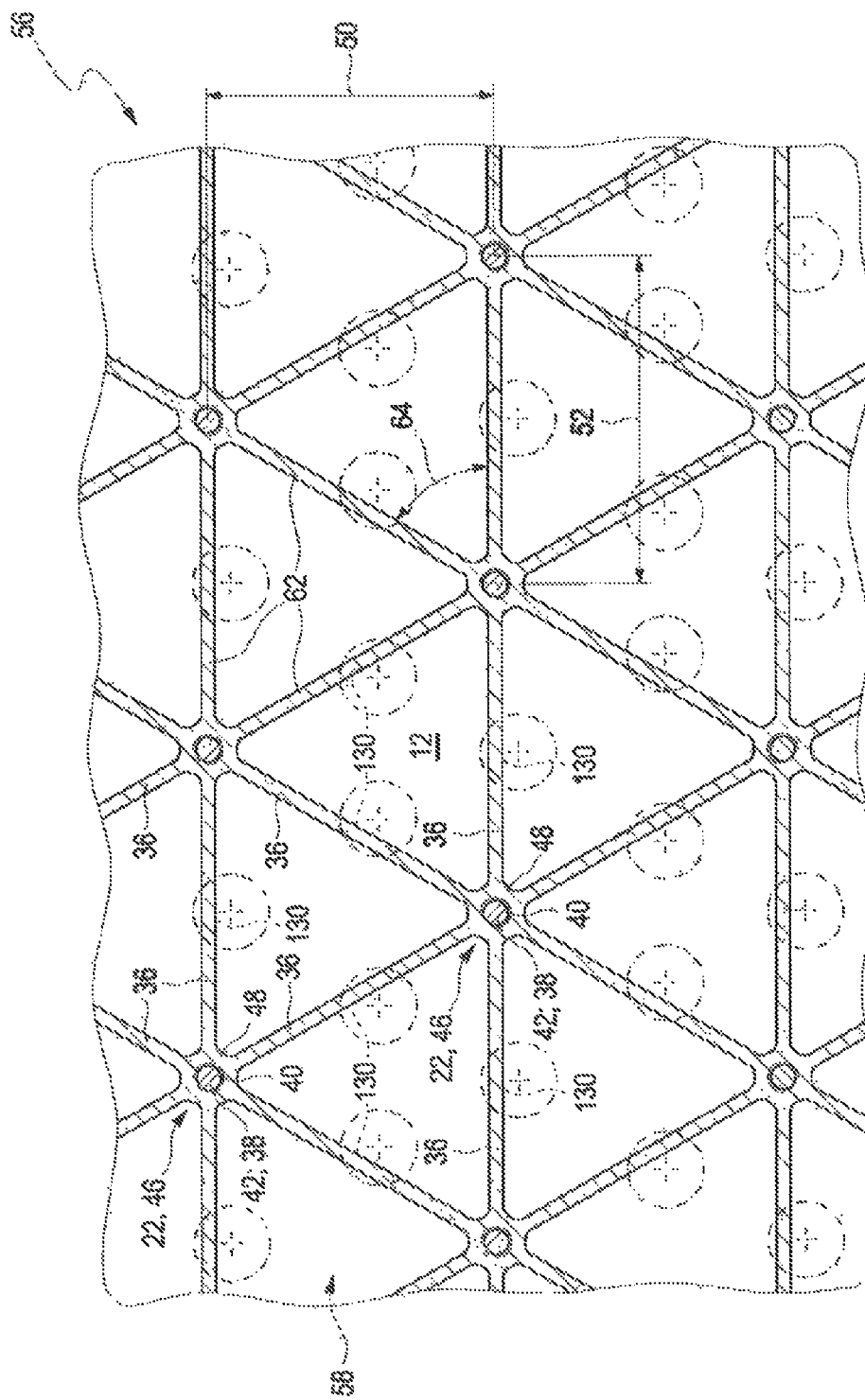
FIG. 8 shows a rib pattern being arranged substantially triangular.

FIG. 8 shows a rib pattern of inwardly extending ribs, the rib pattern having a substantially triangular shape.

According to FIG. 8 a first the ribs 36 in the interior, i.e. the inside area 12 of the bladder-free fuel tank 10, are spaced from one another horizontally by the first distance 50. Fixture elements 22 are spaced from one another by the second distance 52. The first distance 50 and the second distance 52 may be equal or may vary with respect to one another. The triangular rib pattern 62 according to FIG. 8 is further characterized by an angle 64 (α) which is chosen between 30° and 60° particularly 45° but may as well vary, e.g. up to 90° or up to 120°. In dashed-dotted lines, milled pockets 130 are shown. The milled pockets are milled portions at the bottom of the ribs, perpendicular to the drawing plane. The milled pockets 130 are arranged close to the ground plate 44 and to the top plate of the bladder-free fuel tank 10 according to the present invention to allow for a flow of fuel and air between the compartments—in this case triangular shaped compartments—limited by the reinforcing ribs 36 in the inside area 12 of the bladder-free fuel tank 10. By means of the milled pockets, an exchange of fuel and air between neighboring compartments in the inside area 12 of the bladder-free fuel tank 10 according to the present invention is feasible.

Figure 9:
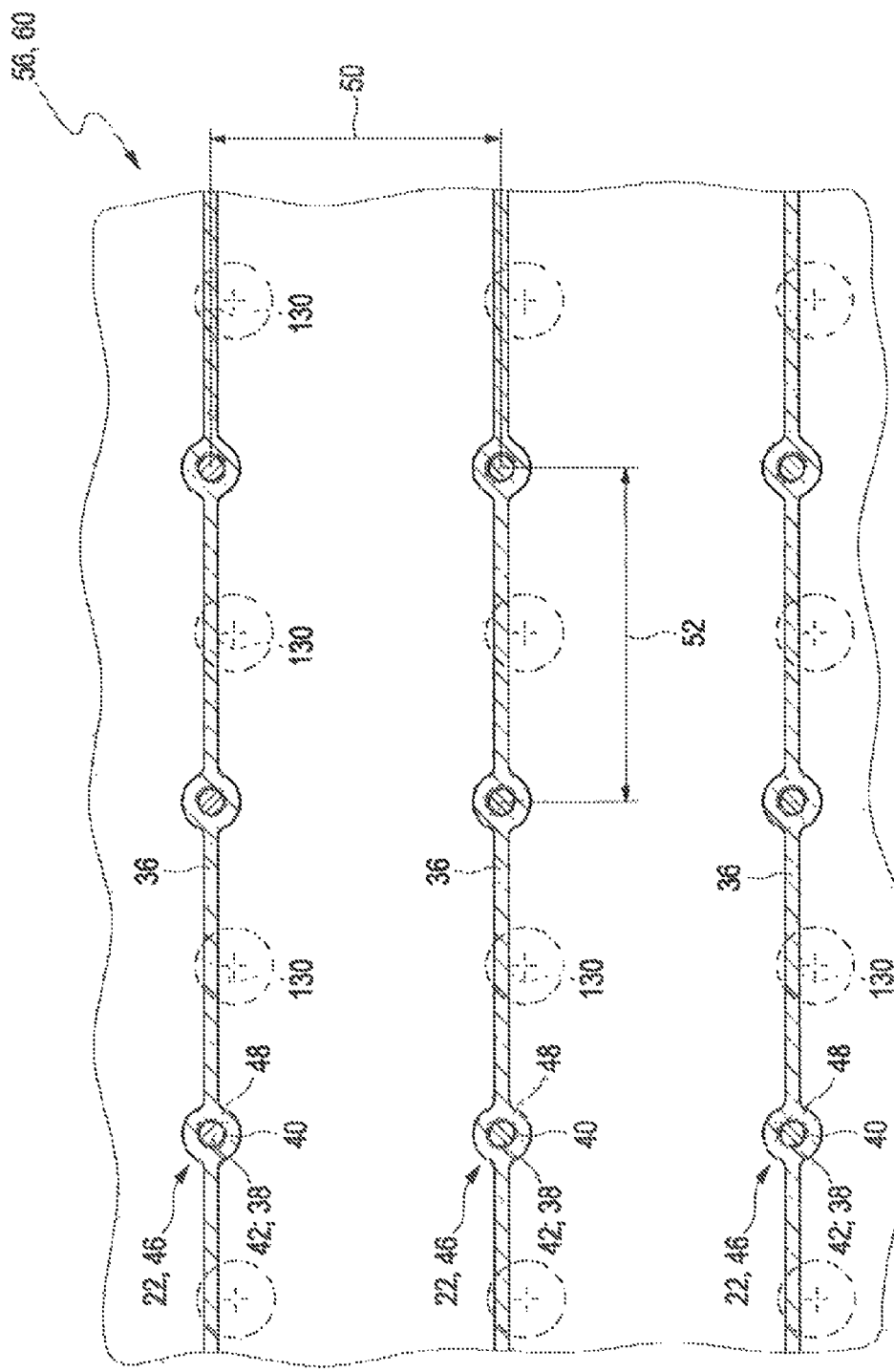
FIG. 9 shows a parallel rib pattern, the reinforcing ribs having milled pockets.

FIG. 9 shows a part of a parallel rib pattern.

As can be derived from the schematical view according to FIG. 9, the inwardly extending ribs 36 are arranged in a parallel rib pattern 60 inside the interior, i.e. the inside area 12 of the bladder-free fuel tank 10 according to the present invention. As can be derived from FIG. 9 the inwardly extending ribs 36 likewise are equipped with milled pockets 130 connecting neighboring compartments, limited by the inwardly extending ribs 36 to allow for an exchange of fuel or air between neighboring compartments in the inside area 12 of the bladder-free fuel tank 10. The fixture elements 22 are spaced apart from one another by the first distance 50. The parallel rib pattern 60 is further characterized by the second distance 52 between each of the in parallel orientated inwardly extending ribs 36.

Figure 10:
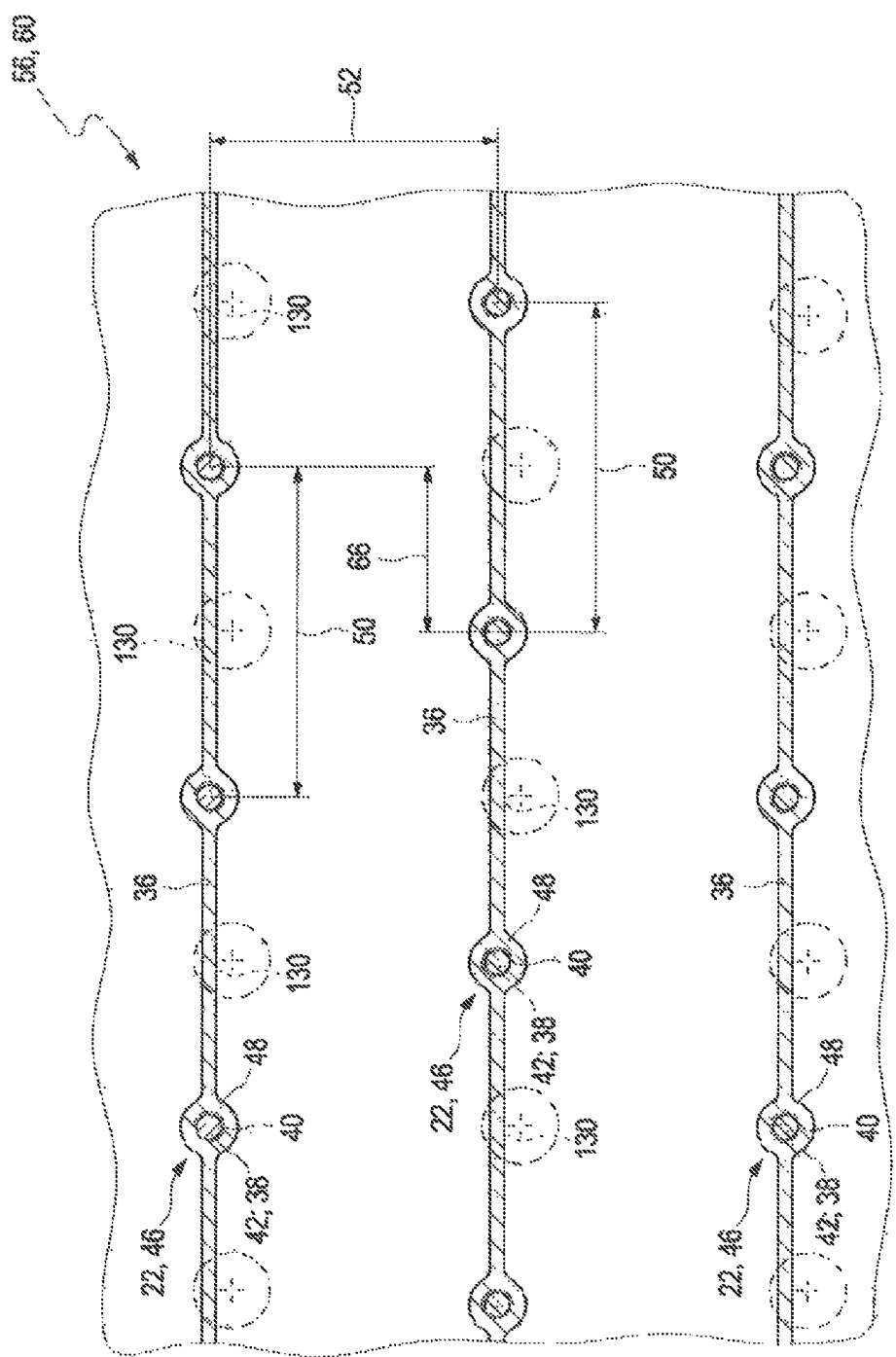
FIG. 10 shows a substantially parallel rib pattern, the ribs arranged with respect to the respective fixtures in an alternate fashion.

FIG. 10 shows a parallel rib pattern similar to the embodiment given in FIG. 9, however, the fixture element being alternately arranged with respect to neighboring, in parallel orientated inwardly extending ribs.

As is shown in FIG. 10, each inwardly extending rib 36 comprises fixture elements 22 spaced with respect to one another by the first distance 50. Similar to the embodiment of the parallel rib pattern 60 given in FIG. 9, the in parallel orientated inwardly extending ribs 36 are spaced from one another by the second distance 52.

Contrary to the embodiment given in FIG. 9, fixture elements 22 may alternate with respect to one another by the alternate fixture points design 66 as schematically shown in FIG. 10. However, similar to the embodiments given in FIG. 9, the parallel rib pattern 60 according to the embodiment given in FIG. 10 comprises inwardly extending ribs 36, each having a number of milled pockets 130 arranged at the bottom of the inwardly extending ribs 36. By means of the milled pockets 130 arranged at the bottom of each of the inwardly extending ribs 36 an exchange of fuel or air between neighboring compartments separated by the inwardly extending ribs 36 from one another is feasible. The milled pockets 130 allow for a collection of fuel to be conveyed into a main tank of an area, the collection being in an integrated sump or a deepening 132 in the bottom of the bladder-free fuel tank 10, i.e. the integrated sump/deepening 132 being manufactured in the ground plate 44 of the bladder-free fuel tank 10 according to the present invention (see FIG. 6).

Figure 11:
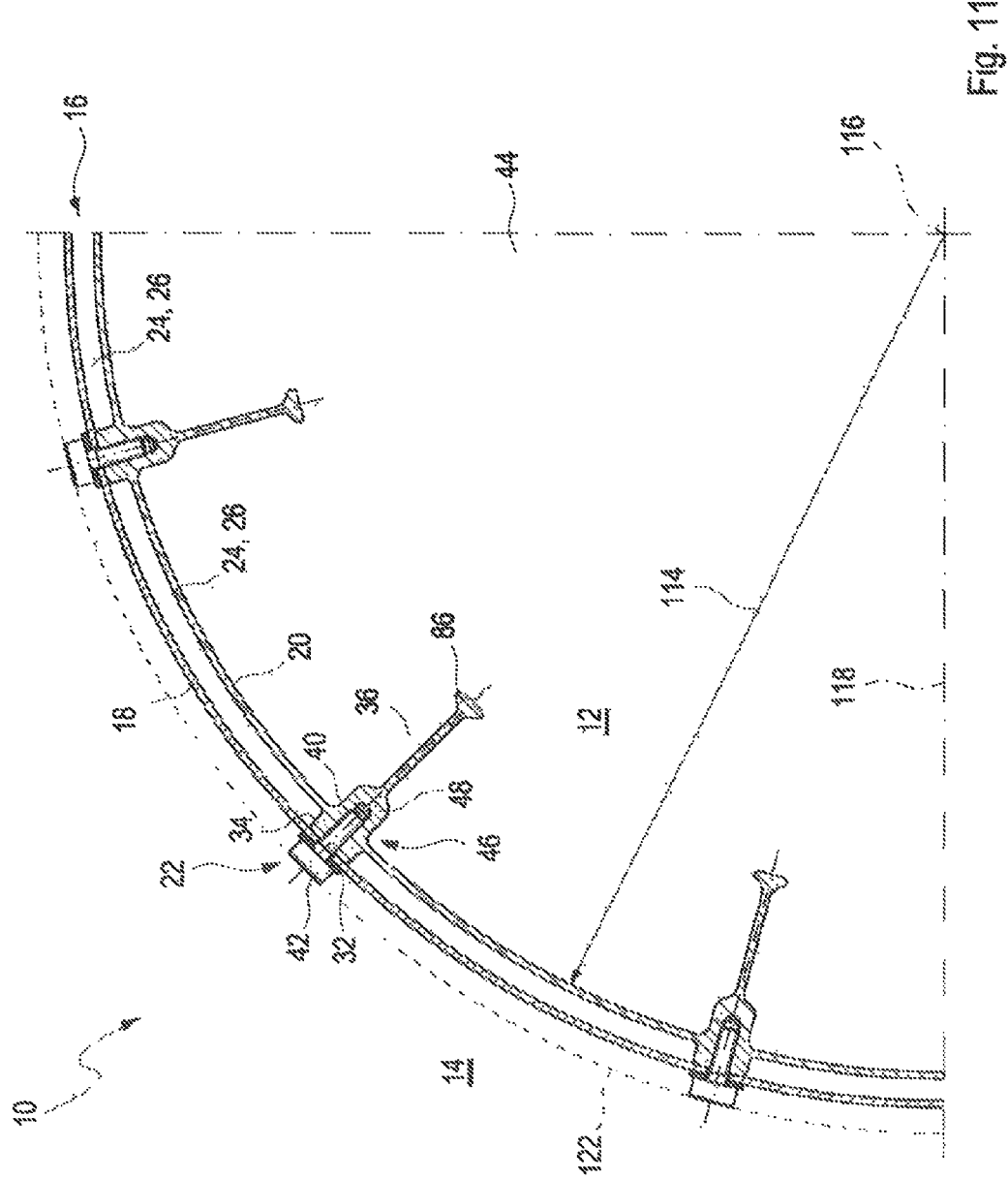
FIG. 11 shows an arch-shaped section of a double-walled structure in a radius with respect to a first axis A.

FIG. 11 shows an arch-shaped section of the double-walled structure 16 of the bladder-free fuel tank 10 according to the present invention.

As can be derived from FIG. 11, the double-walled structure 16 may have an arch-shaped section given in part in FIG. 11. The arch-shaped section of the double-walled structure 16 according to FIG. 11 is manufactured in a radius 114 about a first axis 116. Perpendicular to the drawing plane according to FIG. 11, the arch-shaped section of the double-walled structure 16 as shown in FIG. 11 may additionally be arch-shaped with respect to a second axis 118, i.e. the bladder-free fuel tank 10 according to the present invention in this embodiment having a spherical or semi-spherical shape, for instance when arranged within a tail section of an aircraft.

The arch-shaped section of the double-walled structure 16 according to the embodiment in FIG. 11 comprises the outer wall 18 and the inner wall 20 defining the hollow space 26. The width 27 of the hollow space 26 is defined by the height of dome-shaped elements 34 of the inner wall 20 or inner wall segments 72, 74, respectively. The arch-shaped section according to FIG. 11 describes a 90°-bow within mounting area 46, the outer wall 18 and the inner wall 20 are connected with one another by fixture elements 22 the heads of which define an outer envelope 122 as shown in FIG. 11.

Threadings for the fixture elements 22 are manufactured in local thickenings 48 constituting a mounting area 46 of the fixture elements 22, i.e. screws 42 or bolts 38. From the local thickenings 48 of the inner wall 20 of the double-walled structure 16 inwardly extending ribs 36 extend into the inside area 12 of the bladder-free fuel tank 10 according to the present invention. The inwardly extending ribs 36 may comprise buckling-resistant T-shaped extensions 86 fastened to the ground plate 44 of the bladder-free fuel tank 10 according to the present invention.

Figure 12:
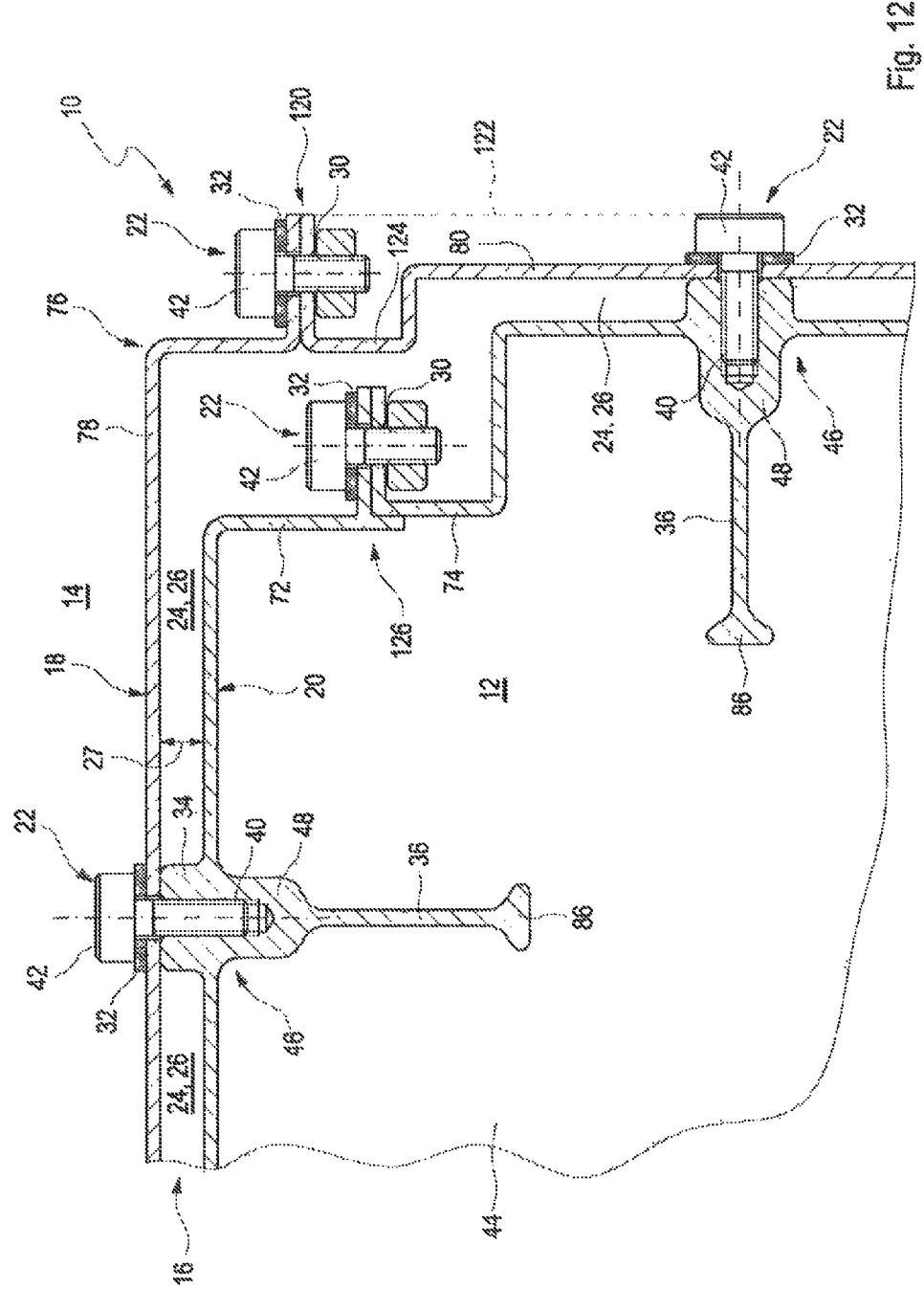
FIG. 12 shows a corner design embodiment of the double-walled structure with an internally arranged fixture element for inner wall segments and an externally arranged fixture element within the outer envelope connecting outer wall segments.

FIG. 12 finally shows a corner design of the double-walled structure of the bladder-free fuel tank 10 according to the present invention.

In the embodiment according to FIG. 12, a corner design 120 of the double-walled structure 16 is shown. The double-walled structure 16 comprises the outer wall 18 and the inner wall 20, or may comprise first and second inner wall segments 72, 74, respectively, and/or first and second outer wall segments 78, 80, respectively. From the interior of the inner wall 20 or inner wall segments 72, 74, respectively, the inwardly extending ribs 36 extend into the inside area 12, i.e. the interior of the bladder-free fuel tank 10 according to the present invention. The inwardly extending ribs 36 further may comprise buckling-resistant T-shaped or L-shaped extensions 86, respectively.

The width 27 of the hollow space 26 of the double-walled structure 16 depends on the height of domes 34 present on the surface of the inner wall 20 or inner wall segments 72, 74, respectively, facing the outer wall 18. The outer wall 18 and the inner wall 20 are connected to each other within mounting areas by fixture elements 22 such as bolts 38 or screws 42.

As can be derived from FIG. 12, the inner wall segments 72, 74, respectively, of the inner wall 20 of the double-walled structure are fastened to each other by an inward arrangement 126 of a fixture element 22. This means that the fixture element 22 connecting the inner wall segments 72, 74, respectively, is arranged within the hollow space 26 having a width 27.

Contrary, outer wall segment 78, 80, respectively, are connected with each other by a fixture element 22 which is arranged within an outer corner recess 124. The fixture element 22 in the outer corner recess 24 is arranged as not to interfere with the outer envelope 122. Which is defined by the head of the fixture elements 22 as best shown in FIG. 12.

The double-walled structure 16, a ground plate 44 of the bladder-free fuel tank 10 according to the present invention may be made of metal materials such as aluminum or aluminum alloys, CFK, GFK or honeycomb materials with respect to the outer wall 18. The space which is occupied by the bladder-free fuel tank 10 according to the present invention is about 6 m² to 8 m² and the usable tank capacity is in a magnitude between 1000 and 1500 l per minimum.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A fuel tank comprising:
   a reservoir formed on an inside area of the fuel tank, the reservoir being limited to an outside area by a double-walled structure, the double-walled structure comprising:
   an outer wall;
   an inner wall;
   a hollow space configured as a drain and/or venting channel for the fuel tank; and
   dome-shaped elements on the inner wall or the outer wall;
   a rib-structure comprising a plurality of ribs extending inwardly into the inside area from the double-walled structure; and
   fasteners for rigidly connecting the outer wall and the inner wall such that the outer wall and the inner wall cannot move relative to one another and a distance between the outer wall and the inner wall is maintained,
   wherein the fasteners comprise screwed connections at the dome-shaped elements.

2. The fuel tank according to claim 1, wherein the outer wall is made of a material comprising aluminum and is shaped as a sheet metal part.

3. The fuel tank according to claim 1, wherein the inner wall is a machine-milled component made from a material comprising aluminum.

4. The fuel tank according to claim 1, wherein the rib-structure extending inwardly into the inside area is part of the inner wall or is a separate component fastened to the inner wall by at least one fixture element.

5. The fuel tank according to claim 1, wherein the rib structure is arranged as a cross-link structure pattern, a diagonal or triangular pattern, or a parallel pattern of inwardly extending ribs.

6. The fuel tank according to claim 1, wherein the inwardly extending ribs comprise buckling resistant T-shaped or L-shaped extensions.

7. The fuel tank according to claim 1, wherein the inwardly extending ribs comprise at least one local thickening and/or at least one buckling avoiding expansion.

8. The fuel tank according to claim 1, wherein, within an overlapping region, edge portions of the outer wall overlap each other and are sealingly connected via fixtures.

9. The fuel tank according to claim 1, wherein the inner wall is a milling part having at least one local strengthening portion or comprises a local thickening.

10. The fuel tank according to claim 1, wherein the dome-shaped elements define a width of the hollow space of the double-walled structure and mounting areas for fixture elements.

11. The fuel tank according to claim 10, wherein the dome-shaped elements maintain the width of the hollow space consistently.

12. The fuel tank according to claim 1, wherein adjacent and/or opposite sections of the double-walled structure are interconnected by inner tie rods, the inner tie rods being connected to the inwardly extending ribs at a plurality of force transmission points.

13. The fuel tank according to claim 12, wherein connectors or plate-shaped connectors are fastened to the inwardly extending ribs at the plurality of force transmission points and to additional ribs and/or the inner tie rod, respectively.

14. The fuel tank according to claim 1, wherein the inwardly extending ribs are formed in a height in relation to the double-walled structure or large additional riveted ribs or tie-rods made in a height to prevent excessive sloshing movements of fuel within the fuel tank.

15. The fuel tank according to claim 1, wherein intake equipment including piping, pumps, valve sensors, or slosh valves are directly mounted to the inwardly extending ribs or to the inner wall.

16. The fuel tank according to claim 1, wherein the fuel tank is an additional center tank or a center tank for an aircraft or for an aircraft application.

17. The fuel tank according to claim 1, wherein the fuel tank is a bladder-free tank.

18. The fuel tank according to claim 1, wherein the hollow space is disposed between the outer wall and the inner wall.

19. The fuel tank according to claim 1, wherein the screwed connections are disposed in areas in which the inner wall is thickened.

* * * * *